UNITED STATES PATENT OFFICE.

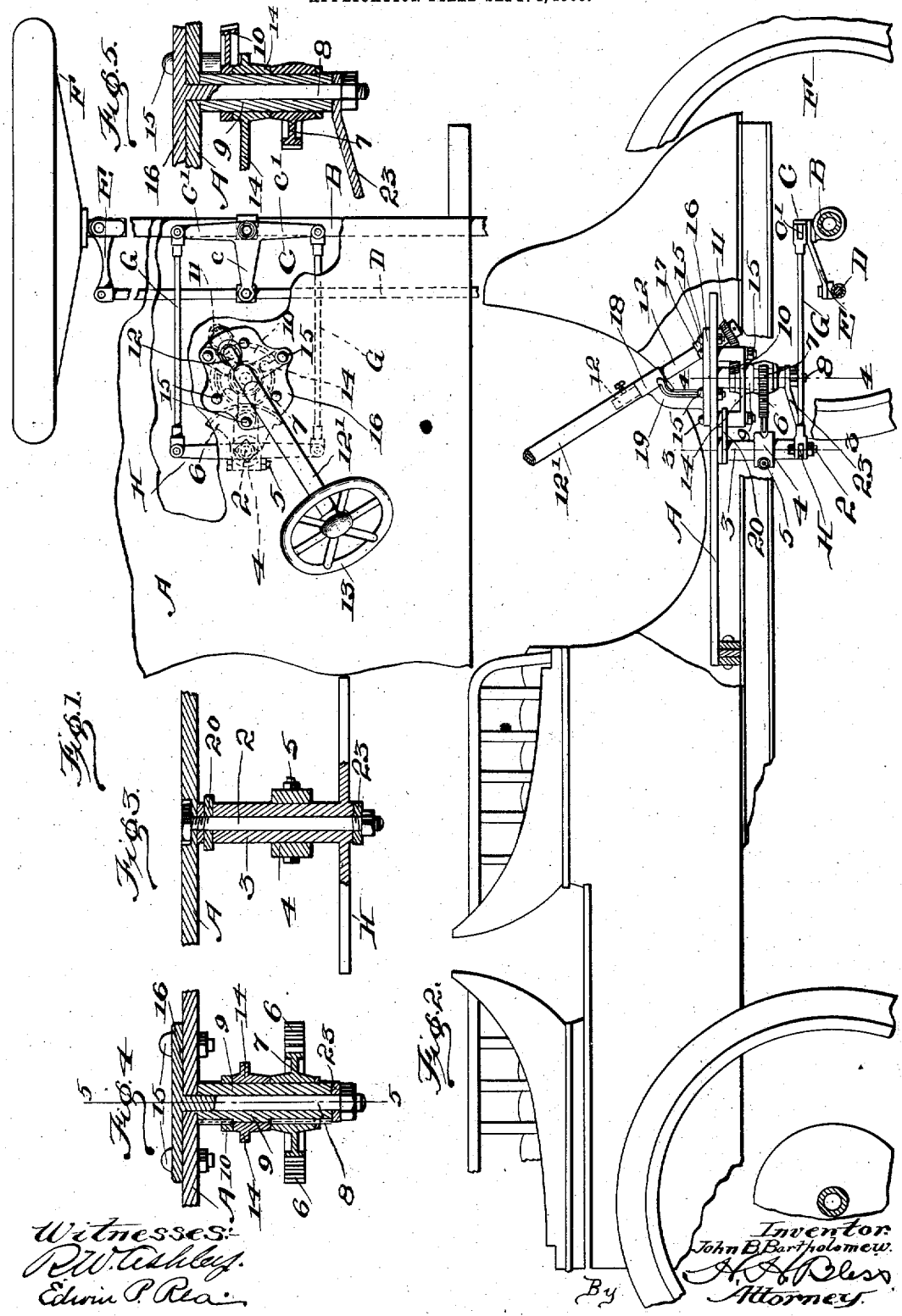

JOHN B. BARTHOLOMEW, OF PEORIA, ILLINOIS, ASSIGNOR TO THE BARTHOLOMEW COMPANY, A CORPORATION OF ILLINOIS.

STEERING DEVICE FOR AUTOMOBILES.

No. 859,592.

Specification of Letters Patent.

Patented July 9, 1907.

Application filed September 4, 1903. Serial No. 171,975.

*To all whom it may concern:*

Be it known that I, JOHN B. BARTHOLOMEW, a citizen of the United States, residing at Peoria, in the county of Peoria and State of Illinois, have invented certain new and useful Improvements in Steering Devices for Automobiles, of which the following is a specification, reference being had therein to the accompanying drawing.

This invention relates to steering mechanism for motor vehicles.

Figure 1 is a top plan view of such mechanism illustrated in connection with sufficient of the frame and running gear of an automobile to make clear the arrangement and operation of the same. Fig. 2 is a side view of the same. Fig. 3 is a vertical section on the line 3—3 of Fig. 2. Fig. 4 is a section on the line 4—4 Fig. 2. Fig. 5 is a section on the line 5—5 Fig. 4.

In such drawings, A designates parts of the body framework of the vehicle and B the front axle thereof. Upon the latter is mounted the T-shaped lever C, one arm $c$ of which is connected with the shift bar D, that in turn is connected with the angular lever E, one arm of which constitutes the stud axle for the wheel F. The oppositely extending arms $c'$ $c'$ of the T-lever C are connected by links G with a rocking bar or lever H supported in rear of the front axle and preferably below the frame A of the vehicle. This rocking bar or lever H is provided at its center with a vertically disposed sleeve 3 that is supported by and turns freely upon a supporting pivot bolt 2 depending from the frame of the vehicle. Secured to the sleeve 3, by the hub 4 and clamping bolt 5, is a gear segment 6 with which meshes the segmental gear pinion 7, supported upon a bolt or pin 8 depending from the frame, this pinion serving as the driver for the gear segment 6. The segmental gear pinion 7 is mounted upon a hollow shaft or sleeve 9 that is free to turn upon the bolt 8 and carries at its upper end a bevel gear segment 10, with which in turn engages a bevel pinion 11 mounted upon the inclined shaft 12 at the upper end of which is the steering wheel 13. The shaft 12 is not only inclined upward and rearward, but also toward one side of the vehicle, as clearly represented in Fig. 1, so that the steering wheel is in proper position relative to the chauffeur.

It is one of the objects of my invention to give a strong and rigid support to the train of gearing which is compactly arranged in the manner already described. As has been stated, the transmission gearing between the shaft 12 and its pinion and the lever H is supported by two shafts or bolts, 2 and 8, that depend from the frame of the vehicle. These shafts are connected by a brace bar 23 uniting their lower ends. The shaft 8 extends through and is supported at about its middle portion by a triangular bracket 14, securely united by the bolts 15 to the frame of the vehicle. These bolts 15 also serve in part to unite the shaft-bearing plate 16 to the frame, the latter being arranged above the frame piece A and provided with the lower bearing 17 for the shaft 12 and the upper bearing 18 therefor, the latter bearing being supported by the bracket or standard 19 rising from the plate 16. I prefer to arrange a tie-plate 20 between the upper end of the bolt 2 and the bolt 15 that unites the rearward extending arm of the triangular bracket 14 with the frame.

The hub of the bevel pinion 11 at the lower end of the steering wheel shaft rests against the bearing 17 and prevents any upward sliding movement of the shaft, and in order to prevent the shaft from sliding in the opposite or downward direction I prefer to form the upper portion thereof—the part that carries the hand wheel 13—of a tube 12' that fits over the reduced portion 12 of the shaft and bears against the upper end of the bearing 18.

It will be seen from this description and an examination of the drawings that the steering gear which I have invented is of very simple and compact arrangement and of rigid construction, all of the parts being securely braced and held in working position, thus insuring against any lost motion or disarrangement of parts.

What I claim is:

1. In a steering device for automobiles, the combination with the steering wheels and the platform or body frame A, of the standard and brace plate secured to the platform, the shaft inclined upward and backward relative to the platform, the bevel gear mounted on the underside of the platform, the segment gear connected to and actuated by the bevel gear, the two double arm levers, one connected to the segment gear and the other connected to the steering wheels, and the links connecting the said levers, substantially as set forth.

2. In a steering device for automobiles, the combination with the vehicle platform and the steering wheels, of the manually operated shaft extending upward and backward relatively to the platform, the bevel gear on the underside of the platform, the segment gear actuated by the bevel gear, and power transmitting devices connecting the segment gear with the steering wheels, substantially as set forth.

3. In a steering device for automobiles, the combination with the steering wheels and the shifting bar, of the lever C having the arm flexibly connected to the shifting bar and the arm $c'$, the lever H, the links connecting the levers, the segment gear connected to the lever H, the bevel gear for actuating the segment gear, and the inclined shaft for actuating the bevel gear, substantially as set forth.

4. In a steering device for automobiles, the combination with the steering wheels, of the two double arm levers, the links connecting the said levers, one of said levers being connected to the steering wheels, and the manually actuated gearing connected to the other, substantially as set forth.

5. In a steering device for automobiles, the combination with the vehicle platform and the steering wheels, of a manually operated steering shaft extending upward and rearward from the platform, a brace plate secured to the platform and provided with two rigidly supported bearings in which the steering shaft is mounted and through which it extends, a bevel pinion at the lower end of the steering shaft, gearing connected with and driven by the said bevel pinion, and power transmitting connections between the said gearing and the steering wheels, substantially as set forth.

6. In a steering device for automobiles, the combination with the steering wheels and the platform of the vehicle, of an upward and rearward inclined steering shaft, a bevel pinion carried by the shaft near its lower end, a vertically disposed supporting bolt, a sleeve turning upon the said bolt and provided with a bevel gear that meshes with the said bevel pinion and also provided with a spur segment, another bolt parallel to the first, a sleeve mounted thereupon and provided with a spur segment engaging with the aforesaid spur segment, and provided also with a rocking bar or lever, and power transmitting connections between the said rocking bar or lever and the steering wheels, substantially as set forth.

7. In a steering device for automobiles, the combination with the steering wheels, the shifting bar, and the steering shaft, of the double arm levers, one of which is pivotally connected to said shifting bar, the gear connected with the other of said double arm levers for actuating it, means connecting said levers together, and the power transmitting mechanism interposed between said gear and steering shaft.

In testimony whereof I affix my signature in presence of two witnesses.

JOHN B. BARTHOLOMEW.

Witnesses:
CHAS. TJADEN,
IRMA B. PENNOYER.